United States Patent [19]
Lohstroh et al.

[11] Patent Number: 5,768,373
[45] Date of Patent: Jun. 16, 1998

[54] METHOD FOR PROVIDING A SECURE NON-REUSABLE ONE-TIME PASSWORD

[75] Inventors: Shawn R. Lohstroh, Princeton, N.J.; David Grawrock, Aloha, Oreg.

[73] Assignee: Symantec Corporation, Cupertino, Calif.

[21] Appl. No.: 643,742

[22] Filed: May 6, 1996

[51] Int. Cl.$^6$ .................................................. H04L 9/08
[52] U.S. Cl. ............................ 380/4; 380/21; 380/25
[58] Field of Search .......................... 380/4, 21, 25

[56] References Cited

U.S. PATENT DOCUMENTS

| | | | |
|---|---|---|---|
| 5,436,972 | 7/1995 | Fischer | 380/25 |
| 5,481,613 | 1/1996 | Ford et al. | 380/21 |
| 5,557,346 | 9/1996 | Lipner et al. | 380/21 |
| 5,557,765 | 9/1996 | Lipner et al. | 380/21 |
| 5,633,928 | 5/1997 | Lenstra et al. | 380/21 |
| 5,640,454 | 6/1997 | Lipner et al. | 380/21 |

*Primary Examiner*—Salvatore Cangialosi
*Attorney, Agent, or Firm*—Fliesler Dubb Meyer & Lovejoy

[57] ABSTRACT

The present invention is directed toward providing a secure method to access data when the user has lost or forgotten the user password. In accordance with the invention and in a system where decryption of an access key will give access to data, two encrypted versions of the access key are created. A first version is formed using a key formed with the user password. A second version is formed using a public key from a public-private key pair. Generally, data access can be had by decrypting the first encrypted version of the access key with the password key. However, if the password is forgotten, access to data can be accomplished by decrypting the second encrypted version of the access key with the private key from the public-private key pair. One embodiment of the invention requires the private key to be stored at a remote site and for decryption using the private key to take place at the remote site. In this manner the user can gain access to data without significantly compromising the data security.

26 Claims, 4 Drawing Sheets

1

METHOD FOR PROVIDING A SECURE NON-REUSABLE ONE-TIME PASSWORD

BACKGROUND OF THE INVENTION

1. Field of Invention

The invention relates to computer security and particularly to computer security when a user has lost or forgotten the user password.

2. Description of Related Art

Many personal computers (PCs) or workstations allow a user to secure data and information stored in a computer by requiring the user to enter a password previously defined by the user. The password is used to limit access to data stored on the computer.

In one type of security system encryption is used to transform "plaintext" data into a form unintelligible to anyone who does not have a decryption key. Data is thus kept private and away from those for whom it is not intended. The password may serve as a decryption key or a means for obtaining the decryption key.

To regain access to encrypted data, the user, often at logon, must type in the user password exactly as he/she previously defined it. The user password is then used to decrypt the data. However, without the user password, access to the data cannot generally be gained.

In a centralized network situation, when a user forgets his/her password, a system administrator can give the user access to his/her files by overriding the user password function through a backdoor access, or, if passwords are centrally stored, obtaining the password for the user. However, with a freestanding PC or workstation, unlike with networks, there is no centralized administration or access to passwords, and loss of a user password in an independent PC or workstation situation can be devastating.

Typically, if a user forgets the user password, for unlocking all files the entire computer product must be removed/replaced and/or the data encrypted with the password must be erased since it is unintelligible without a decryption key. Generally, loss of a user password in such a situation will cause the user to lose a significant amount, if not all, of the user's protected data.

Thus, it is desirable to develop a system which allows a user to gain access to his/her computer data even if the user has forgotten the password. However, because data security is of prime significance to users who use passwords, it is also desirable to allow a user to override password protection to data in a way that does not significantly compromise the security of the data.

SUMMARY OF THE INVENTION

In accordance with the invention, two encrypted versions of an access key are created. A first version is formed by encrypting the access key with a key formed from the user password. A second version is formed by encrypting the access key with the public key in a public-private key pair.

To regain system access, if the user does not recall the user password, the second encrypted version of the access key is decrypted with an asymmetric decryption algorithm, and data access can then be obtained. In one embodiment of the invention, the asymmetric decryption algorithm uses the private key from a public-private key pair, which is stored at a remote location from the user's computer system.

The method is advantageous in that it allows computer data access when the user forgets the user password without significantly compromising data security and without having to attempt to decrypt encrypted data stored on the computer without a decryption key.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
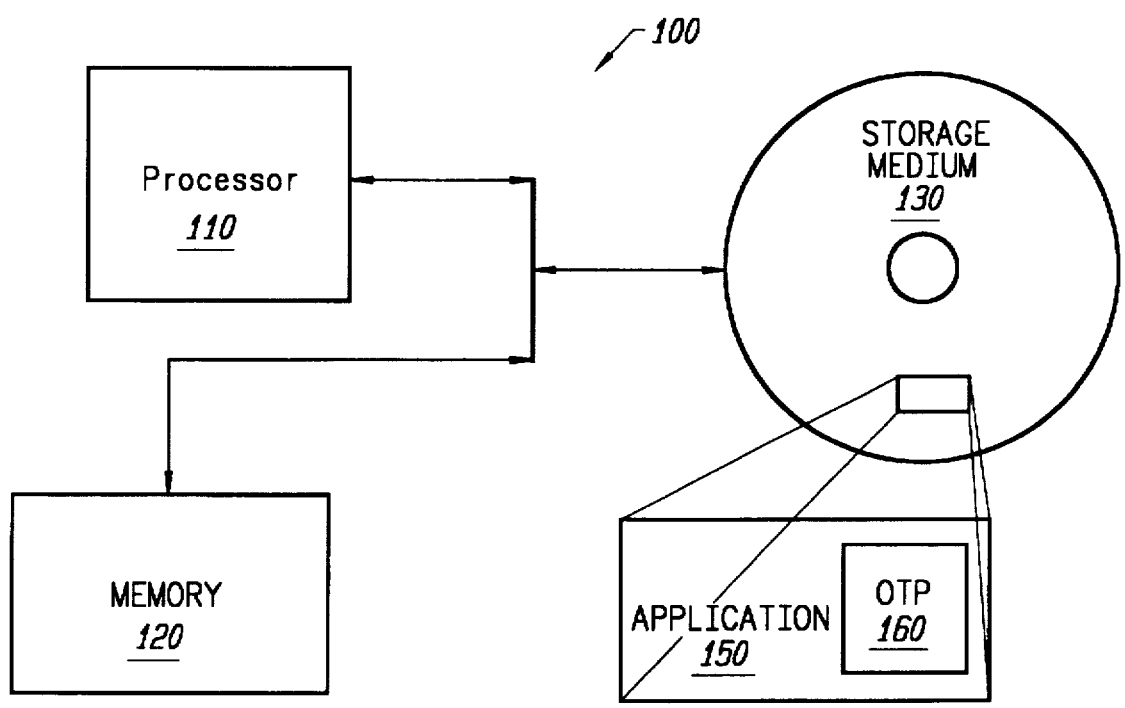
FIG. 1 is a block diagram of a computer system in accordance with one embodiment of the invention.

FIG. 1 shows a first computer system 100, having at least a processor 110, a memory 120 such as RAM, and a non-volatile storage medium 130. Storage medium 130 may include one or more machine-readable media including semiconductor memories (e.g., EEPROM), optical and magnetic media (e.g., floppy disks, hard disks, CD-ROM), etc. In order to aid the user in securing access to data stored on computer system 100, various application/logon programs have been developed. As shown in FIG. 1, an application 150 resides in storage medium 130. In an alternative embodiment, application 150 resides in memory 120. Application 150 interacts with the user and the system to secure data access to the user and those designated by the user.

One embodiment of the invention is an instruction set, shown as a one time password (OTP) program 160 in FIG. 1, residing in storage medium 130 as part of application 150, which is executed by processor 110. OTP program 160 interacts with application 150 to secure data access (discussed in more detail below). Alternatively, OTP program 160 may reside in memory 120.

Figure 2:
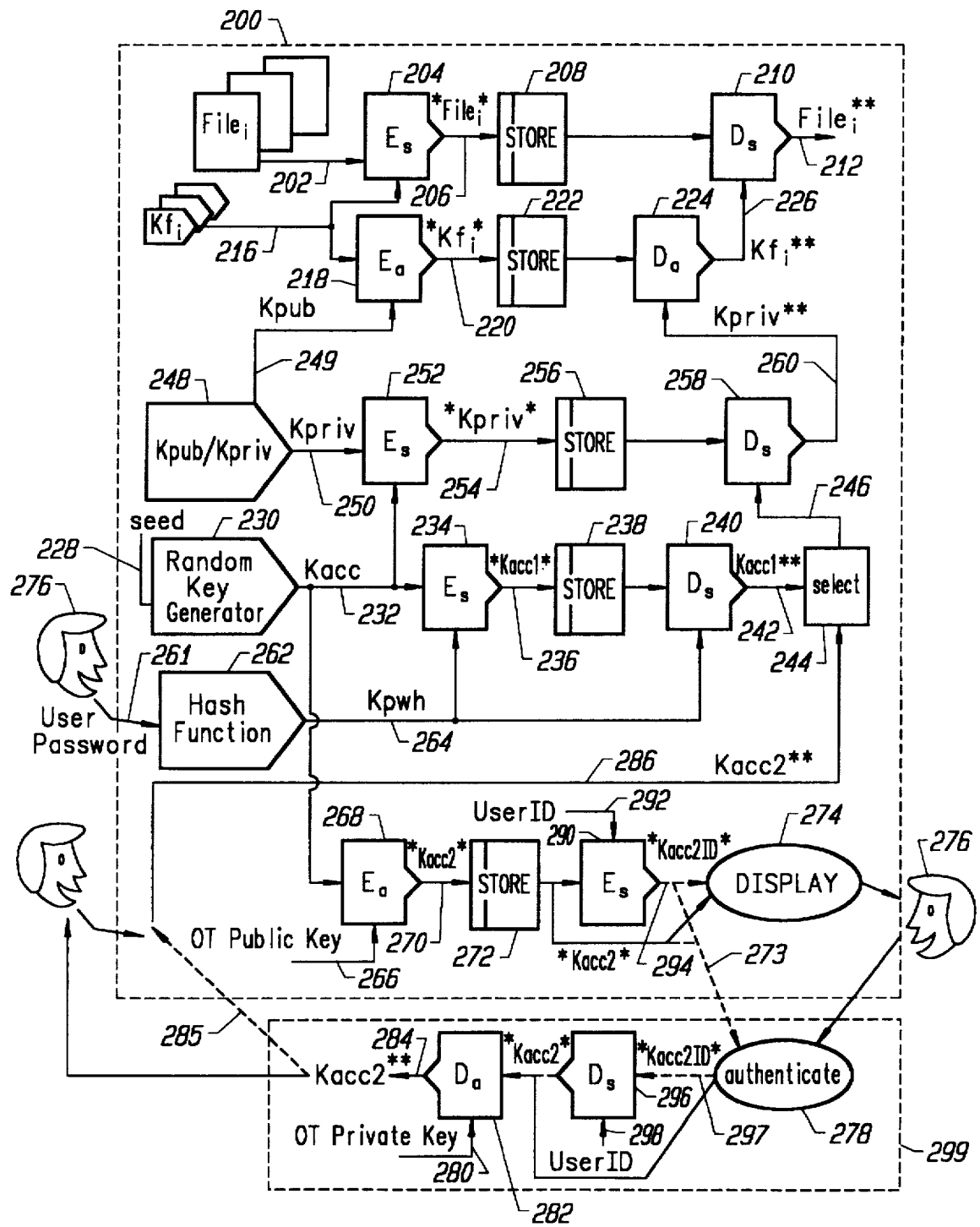
FIG. 2 is a diagram of a security system in accordance with the invention.

Referring to FIG. 2, a OTP mechanism in accordance with the invention is described. In a computer system 200, each file, File$_i$ where i=1 ... n, is associated with an encryption unit 204 and with a file key $K_{fi}$, i=1 ... n. Encrypting unit 204 receives plaintext file data on line 202 and encrypts file data to create encrypted *File$_i$* on line 206. Items bound by a pair of asterisks are used herein to indicate the items are encrypted. A file encryption key, $K_{fi}$, is supplied as an encryption key to the key input of encrypting unit 204 on line 216.

The encrypted *File$_i$* is stored in a region 208 of a non-volatile storage means such as a hard disk. To retrieve an intelligible version of the stored *File$_i$*, the *File$_i$* data is extracted from storage region 208 and supplied to decrypting unit 210. The encryption/decryption algorithm performed by units 204/210 is preferably a symmetric one, meaning that the same key $K_{fi}$ used for encryption by encrypting unit 204 must be used by decrypting unit 210 for decryption.

If a plaintext version of the file encryption key $K_{fi}$ is stored on the non-volatile storage means, system security will be compromised if an unauthorized person discovers its location. Thus, the file encryption key $K_{fi}$ is supplied to encrypting unit 218 and an encrypted version, *$K_{fi}$*, is produced on line 220. *$K_{fi}$* is stored in region 222 of nonvolatile storage means. In this manner, if an unauthorized person discovers region 222, the plaintext version of key $K_{fi}$ remains unavailable.

In order to encrypt $K_f$, an encryption key also needs to be supplied to encrypting unit 218. Thus, a user public key $K_{pub}$ is produced on line 249 by public-private key generator 248. The encryption/decryption algorithm utilized by encryption unit 218 is not a symmetric one, meaning that a key other than $K_{pub}$ will be necessary to decrypt the encrypted *$K_f$*. Thus public-private key generator 248 also generates a second key, $K_{1priv}$, for decrypting data encrypted in unit 218.

Public-private key generator 248 generates keys in accordance with a public-key cryptography system, a general description of which will here be useful. In public key cryptography, each encrypting/decrypting entity utilizes a pair of keys: a public key, which is published, and a private key, which is kept secret. The public key is used to encrypt the data, but only the private key can decrypt the data. Thus, once encrypted, data is available only to the private key holder. In this manner, the public key and the private key work together as a complementary pair. The most common public-key cryptography system is RSA public-key cryptography, which is generally known in the art and, in fact, has become a de facto standard. General information about RSA public-key cryptography can be found in U.S. Pat. No. 4,405,829.

Using a user public key to encrypt $K_f$ is beneficial in that it allows files to be accessible to more than a single user. For example, if File, is owned by user1, user1 can designate user1, user2 and user3 to have access to File,. User1 would encrypt $K_f$ three separate times: once with each of user1's, user2's, and user3's public keys ($K_{pub1}$, $K_{pub2}$, and $K_{pub3}$) to form *$K_f$–1*, *$K_f$–2*, and *$K_f$–3*, respectively.

However, once $K_f$ is encrypted in encryption unit 218, e.g., to obtain *$K_f$–1*, using user1's public key, $K_{pub1}$ only the user's private key, $K_{priv1}$, applied to decryption unit 224, will be able to recover a useable form of $K_f$. Thus, user1 can only access a file using user1's private key ($K_{priv1}$) and user2 can only access the same file with $K_{priv2}$.

Generally, encryption/decryption units 218/224 operate in accordance with an asymmetric algorithm such as those found in RSA Corp.'s Bsafe Library™, a publicly available product. Further, the public-private key pair generated by public-private key generator 248 may generally be between 360 and 2048 bits in length. However, use of at least 768 bits is preferred because use of any fewer bits may result in easily penetrable security.

However, even using asymmetric algorithms, if any user's $K_{priv}$ is stored on the storage medium and is not itself encrypted, data security will again be compromised if an unauthorized person discovers its location. Thus, each $K_{priv}$ is supplied on a line 250 to an encryption unit 252, and an encrypted version, *$K_{priv}$*, is produced on line 254. *$K_{priv}$* is then stored in storage region 256 of non-volatile storage means and is unreadable by unauthorized persons.

When a user desires to access a file, the user must extract *$K_{priv}$* from storage region 256 and decrypt it in decryption unit 258, producing decrypted $K_{priv}$ Items that have been previously encrypted and thereafter decrypted are indicated as being followed by a pair of asterisks. $K_{priv}$ is then applied on line 260 to decryption unit 224, resulting in decrypted key $K_f$**. *File,* is then extracted from storage region 208 and $K_f$ is applied to decryption unit 210 and File, is produced, the desired result.

Returning to $K_{priv}$ encryption at encryption unit 252, to encrypt $K_{priv}$, an access key, $K_{acc}$ is supplied on line 232 to encryption unit 252. $K_{acc}$ is produced on line 232 by a random key generator 230 and in one embodiment $K_{acc}$ is 128 bits in length. Further, in one embodiment of the invention, random key generator 230 is a random number generator. A suitable random number generator can be found in RSA Corp.'s Bsafe Library™, although other random number generators are also suitable. Generally, random number generators have to be "seeded" with some sort of initial vector (or "seed") 228. Such a seed in one embodiment of the invention may be produced using timers (e.g., the length of time it takes the user to type a certain number of keystrokes). Other embodiments may use other well known random seed generators to produce such a seed.

The encryption/decryption algorithm performed by units 252 and 258 is symmetric. Thus, since $K_{acc}$ is supplied to encryption unit 252, $K_{acc}$ must also be supplied to decryption unit 258. Yet, as with other keys, if $K_{acc}$ is stored in plaintext form in non-volatile storage means, and sometime later an unauthorized person discovers the location of $K_{acc}$, the security of data will be compromised as other encrypted keys will then become accessible. Therefore, access key $K_{acc}$ is supplied on line 232 to encrypting unit 234 which operates according to well-known symmetric encryption/decryption algorithms such as "Blowfish", which can generally be found in Bruce Schneier, Applied Cryptography (2d.Ed. 1995). The resulting encrypted signal *$K_{acc1}$* produced on line 236 is stored in storage region 238. The key signal that is applied to encrypting unit 234 on line 264 is $K_{pwh}$ and is produced by hashing unit 262 from a user-supplied password on line 261. "Hashing" is generally the using of an algorithm to take a variable size input and produce a unique fixed-length identifier representative of the original input (here, the user password). One hash algorithm, MD5, or message digest 5, is generally known in the art, and is suitable for hashing a user password. Other algorithms are also generally known and are also suitable for hashing a user password in accordance with the invention. Often hash functions are thought to take a large block of data and reduce it to a smaller block. However, because the user password can vary from a few characters to up to 99 bytes in one embodiment, hash function 262 may produce a larger or smaller block of data than a given input (the user password), but it will return a password hash ($K_{pwh}$) of consistently fixed length. In one embodiment using the MD5 hash function, such fixed length is set to 16 bytes.

To retrieve the access key, $K_{acc}$, the user must enter the correct password on line 261 into hashing unit 262. The resulting signal, $K_{pwh}$, on line 264 is applied to decryption unit 240. The resulting, decrypted access key on line 242 is now referred to as $K_{acc1}$. This decrypted access key $K_{acc1}$ is passed through selector 244 and supplied on line 246 to decryption unit 258 to obtain decrypted $K_{priv}$ and, ultimately, to obtain decrypted File, information.

As can be seen from the above discussion, access to secured files is ultimately through entry of the user password 261. That is, user password 261 is entered into user system 200 and is applied to hash function 262 to obtain $K_{pwh}$. $K_{pwh}$ is used to decrypt *$K_{acc1}$* to obtain $K_{acc1}$. $K_{acc1}$ is then used to decrypt *$K_{priv}$* to obtain $K_{priv}$, which is used to obtain decrypted $K_f$ and ultimately decrypted File,. The user password 261 is not stored anywhere in the computer system. If the password were so stored, the security of the system would be compromised by anyone discovering its location. Yet if the user forgets his/her password, access to decrypted File, cannot be obtained through the above-described method.

Thus, further in accordance with the invention, when $K_{acc}$ is encrypted at encrypting unit 234, it is also passed through encrypting unit 268 to form a second encrypted access key *$K_{acc2}$* on line 270. *$K_{acc2}$* is stored in storage region 272.

Encrypting unit 268 operates according to an asymmetric encryption/decryption algorithm, such as those found in RSA Corp.'s Bsafe Library™, meaning that different keys are used for encryption and decryption, respectively. A one-time (OT) public key is applied on line 266 to encrypting unit 268. A companion, but different OT private key 280 will be later applied to a companion decrypting unit 282. The OT public key ($K_{otpub}$) and OT private key ($K_{otpriv}$) are generated in accordance with a public-key cryptography system and preferably in accordance with RSA public-key cryptography, discussed previously. Further, OT public-private key pairs are preferably 1024 bits in length, but other lengths are also suitable.

The OT private key is held by an authenticating entity 299, remote from user system 200, in a secure location. In one embodiment, this authenticating entity 299 is referred to as a "help desk". The help desk can comprise a human at a terminal or it can be an automated entity. The OT public key is stored on the user's computer system 200. The OT public-private key pair is generated, in one embodiment, before distribution of system 200 to the user, allowing for storage of OT public key on user system 200. In other embodiments the OT public-private key pair is generated by user system 200 subsequent to distribution. In such an embodiment, OT private key would be communicated via a secure channel to authenticating entity 299 along with various identifying information.

When the user forgets his/her password, a one-time password mechanism is activated to read the encrypted signal $*K_{acc2}*$ stored in storage region 272 and to output that $*K_{acc2}*$ signal, for example, to a display monitor 274. User 276 reads the displayed information and communicates it by a secured channel to the authenticating entity 299. Such communication with the authenticating entity can be obtained via verbal telephone communication. In an alternate embodiment, the fetched data $*K_{acc2}*$ is transmitted through a secure channel 273 via modem to the authenticating entity 299, in which case display of $*K_{acc2}*$ may be unnecessary. In either case, user 276 must supply additional authenticating information to the authenticating entity 299 to prove that user 276 is whom he or she claims to be. An example is randomly selected personal information about the user such as date of birth and/or mother's maiden name. The user 276 may demand that the authenticating entity 278 also prove that it is whom it claims to be.

Optionally, one embodiment of the invention further includes encryption unit 290 and decryption unit 296, to further ensure user authentication. Rather than having $*K_{acc2}*$ go directly from storage region 272 to display 274, $*K_{acc2}*$ is encrypted in encryption unit 290 using the user's UserID (e.g., a logon name) as the encryption key for a symmetric encryption algorithm. $*K_{acc2ID}*$ results and is displayed for user 276 communication, or is otherwise communicated, to authenticating entity 299. Authenticating entity 299, then, in addition to requesting identifying information from the user 276 will request the user's UserID. The authenticating entity decrypts $*K_{acc2ID}*$ using the UserID conveyed. Thus, because a user must supply UserID information in addition to other identifying information, system security is further enhanced.

If the UserID's match, $*K_{acc2ID}*$ is decrypted in decrypting unit 296 to recover $*K_{acc2}*$, which in turn is applied to decrypting unit 282. If decrypting unit 296 is not utilized, $*K_{acc2}*$ is passed directly to decrypting unit 282 subsequent to user authentication 278. The authenticating entity 299 applies its OT private key to the key-input 280 of unit 282. The output 284 of unit 282 is the decrypted access key $K_{acc2}$ which is then returned verbally to the user 276 for entry into system 200 in one embodiment. Alternatively, $K_{acc2}$ is returned directly via a secure communication channel 285 to user system 200. In either case, $K_{acc2}$ is applied to line 286 of the user's system. This returned, secondary access key $K_{acc2}$ is then passed through selector 244, which selects between $K_{acc1}$ and $K_{acc2}$, and $K_{acc2}$ used to unlock the remainder of the system.

Immediately thereafter, random key generator 230 is activated to generate a new access key $K_{acc}$. The user is prompted to enter a new password 261. The securing process repeats all over again.

User system 200 shown in FIG. 2 may be implemented in one embodiment of the invention as OTP program computer code and stored on a non-volatile storage medium 130 (FIG. 1) such as a floppy disk or hard disk. In such an embodiment, storage regions 238, 256, and 272 may be represented by a logon record data structure. Such computer code, when activated may be transferred to memory 120 (FIG. 1) such as RAM and executed by a processor 110 (FIG. 1). Alternatively, user system 200 may be implemented as dedicated hardware.

Figure 3:
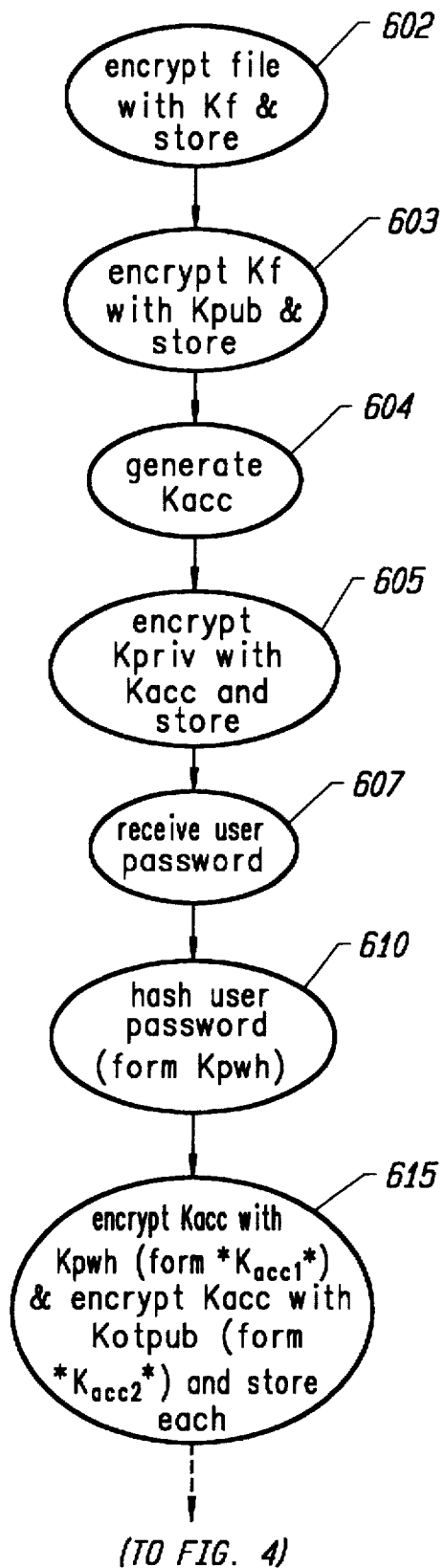
FIGS. 3 and 4 together show a flow diagram in accordance with one embodiment of the invention.

FIG. 3 shows the steps followed in accordance with one embodiment of the present invention. File$_i$data is encrypted with $K_{fi}$ in step 602 to form $*File_i*$ which is stored. $K_{fi}$ is encrypted with $K_{pub}$, step 603 to form $*K_{fi}*$ and stored. In step 604, access key, $K_{acc1}$ is generated, and, in step 605, $K_{priv}$ is encrypted with $K_{acc}$ and stored. The user password, received in step 607, is hashed, step 610, and $K_{acc}$ is encrypted with each $K_{pwh}$ and $K_{otpub}$ in step 615 forming $*K_{acc1}*$ and $*K_{acc2}*$, respectively. Note that while FIG. 3 shows step 604 following step 603, in other embodiments step 604 can precede steps 602 or 603 or can be performed simultaneously with either steps 602 or 603. Likewise, steps 607 and 610 can occur any time before, or simultaneously with, any of steps 602–605, provided step 610 follows step 607.

Figure 4:
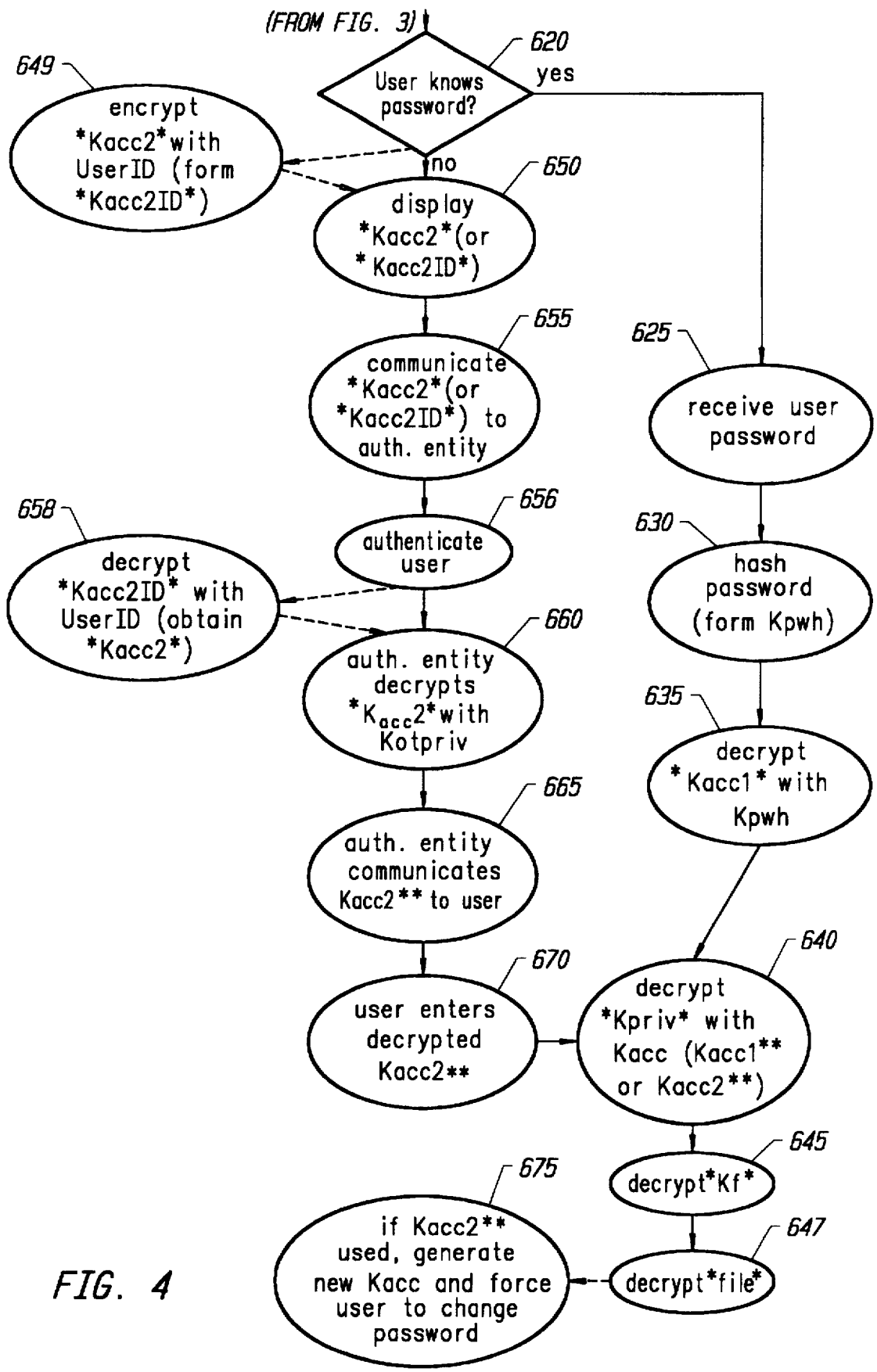

When the user attempts to regain data access later, referring to FIG. 4, if the user knows his password, step 620, then the user enters his password, step 625, the hash of the entered user password is taken, step 630, $*K_{acc1}*$ is decrypted with $K_{pwh}$, step 635, and $*K_{priv}*$ is decrypted with $K_{acc1}**$, step 640. $*K_{fi}*$ is then decrypted, step 645, and $*File_i*$ can be decrypted, the desired result, step 647.

However, if at step 620 the user does not know his password when he attempts to gain data access. $*K_{acc2}*$ is displayed, step 650. Alternatively, in one embodiment, $*K_{acc2}*$ may optionally be further encrypted with UserID, to form $*K_{acc2ID}*$, step 649, for better user authentication, and then $*K_{acc2}*$ is displayed in step 650. Following display, the user may then communicate the encrypted $*K_{acc2}*$ to the authenticating entity, step 655. Note, as previously discussed, some methods of communication may not require display of $*K_{acc2}*$, in which case step 650 can be bypassed in some embodiments of the invention. Upon receiving the user's communication, authenticating entity authenticates the user, step 656, by requesting certain identifying information of the user. Optionally, if step 649 was performed, authenticating entity will decrypt $*K_{acc2ID}*$ with the UserID, obtained by authentication entity from the user in step 656, to recover $*K_{acc2}*$, step 658. In step 660, the authenticating entity decrypts $*K_{acc2}*$ with $K_{otpriv}$, the OT private key. The authenticating entity then communicates the decrypted $K_{acc2}$ to the user in step 665, and the user enters the decrypted $K_{acc2}$ on his or her system, step 670. (Note here again that the method of communication may be by directly transmitting the decrypted $K_{acc2}^{}$ to the user's system.) By receiving a decrypted $K_{acc2}^{}$, $*K_{priv}^{*}$ can be decrypted, step 640. $*K_{fi}^{*}$ is then decrypted, step 645, and file access, step 647, is obtained.

If $*K_{acc2}^{*}$ was decrypted by the authenticating entity with the OT private key, then, in step 675, a new $K_{acc}$ will be automatically generated and the user will be prompted to change the user password. In this manner, a one-time password feature is enabled that does not significantly compromise data security and does not require decrypting any encrypted data without a decryption key. Further, because all File$_i$ are encrypted with a $K_{fi}$ and not $K_{acc}$, the system in accordance with the invention is transparent to the files, File$_i$; that is, files do not have to be decrypted and/or re-encrypted when the user loses his or her password.

It should be understood that the particular embodiments described above are only illustrative of the principles of the present invention, and various modifications could be made by those skilled in the art without departing from the scope and spirit of the invention. For instance, if the entire PC/workstation is not secured with a password, but only certain data is secured, it should be understood that an embodiment in accordance with the invention can be used to access that data and that it is not a requirement of the invention that whole system access be obtained or that it be obtained immediately at logon. Thus, the scope of the present invention is limited only by the claims that follow.

What is claimed is:

1. A method of securing an access key, comprising the steps of:
   a) encrypting said access key with a first encryption algorithm to form a first encrypted version of said access key;
   b) encrypting said access key with a second, asymmetric encryption algorithm to form a second encrypted version of said access key; and
   c) storing said first encrypted version of said access key and said second encrypted version of said access key.

2. The method of claim 1, further comprising the step of: decrypting said first encrypted version of said access key with a decryption algorithm.

3. The method of claim 1, further comprising the step of: decrypting said second encrypted version of said access key with an asymmetric decryption algorithm.

4. The method of claim 3, wherein:
   said step of encrypting said access key with said second asymmetric algorithm includes obtaining a public key from a public-private key pair; and
   said step of decrypting said second encrypted version of said access key with an asymmetric decryption algorithm includes obtaining a private key from said public-private key pair.

5. The method of claim 3, wherein said step of decrypting said second encrypted version of said access key with an asymmetric decryption algorithm is performed at a remote site.

6. A method of securing an access key, comprising the steps of:
   receiving a user password;
   obtaining a public key from a public-private key pair;
   creating an encryption key with said user password;
   encrypting said access key with a first symmetric encryption unit to form a first encrypted version of said access key, said first symmetric encryption unit utilizing said encryption key;
   encrypting said access key with a second asymmetric encryption unit to form a second encrypted version of said access key, said second asymmetric encryption unit utilizing said public key; and
   storing said first encrypted version of said access key and storing said second encrypted version of said access key on a storage medium.

7. The method of claim 6, wherein:
   the step of encrypting said access key with a first symmetric encryption unit includes encrypting said access key in accordance with a symmetric encryption algorithm; and
   the step of encrypting said access key with a second asymmetric encryption unit includes encrypting said access key in accordance with a public-key cryptography algorithm.

8. The method of claim 6, wherein:
   the step of obtaining a public key includes generating a public key in accordance with a public-key cryptography algorithm.

9. The method of claim 6, wherein:
   the step of creating an encryption key includes hashing said user password.

10. The method of claim 6, further comprising the step of obtaining a decrypted access key.

11. The method of claim 10, wherein said step of obtaining a decrypted access key includes:
    receiving said user password;
    recreating said encryption key with said user password; and
    decrypting said first encrypted version of said access key with a symmetric decryption unit utilizing said encryption key as a decryption key.

12. The method of claim 10, wherein said step of obtaining a decrypted access key includes receiving said decrypted access key, said decrypted access key having been remotely decrypted.

13. The method of claim 10, wherein said step of obtaining a decrypted access key includes:
    decrypting said second encrypted version of said access key with an asymmetric decryption unit utilizing a private key from said public-private key pair.

14. The method of claim 13, wherein said private key is stored at a remote site and said step of decrypting said second encrypted version of said access key with an asymmetric decryption unit is performed at said remote site.

15. A method of securing computer data, comprising the steps of:
    generating an access key with a random number generator;
    receiving a user password;
    obtaining a public key from a public-private key pair, said public-key generated in accordance with a method of public-key cryptography;
    encrypting information with a first encryption unit using said access key to create encrypted information;
    storing said encrypted information;
    hashing said user password to obtain a password hash;
    encrypting said access key with a second encryption unit to form a first encrypted version of said access key, said second encryption unit using said password hash, said second encryption unit operating in accordance with a symmetric encryption/decryption algorithm;
    storing said first encrypted version of said access key;

encrypting said access key with a third asymmetric encryption unit to form a second encrypted version of said access key, said third asymmetric encryption unit using said public key, and said asymmetric encryption unit operating in accordance with said method of public-key cryptography; and storing said second encrypted version of said access key.

16. The method of claim 15, further comprising the steps of:

obtaining a decrypted access key;

retrieving said encrypted information; and decrypting said encrypted information with a first decryption unit using said decrypted access key.

17. The method of claim 16, wherein said step of obtaining a decrypted access key includes:

receiving said user password;

rehashing said user password to obtain said password hash;

retrieving said first encrypted version of said access key; and decrypting said first encrypted version of said access key with a second decryption unit using said password hash, said second decryption unit operating in accordance with said symmetric encryption/decryption algorithm.

18. The method of claim 16, wherein said step of obtaining a decrypted access key includes:

decrypting said second encrypted version of said access key in an asymmetric decryption unit using a private key from said public-private key pair, said asymmetric decryption unit operating in accordance with said method of public-key cryptography.

19. The method of claim 18, wherein said step of decrypting said second encrypted version of said access key is performed at a remote site.

20. The method of claim 16, wherein said step of obtaining a decrypted access key includes:

retrieving said second encrypted version of said access key;

communicating said second encrypted version of said access key to an authenticating entity;

receiving, from said authenticating entity, said decrypted access key, said decrypted access key having been created by decrypting said second encrypted version of said access key in an asymmetric decryption unit with a private key from said public-private key pair, said asymmetric decryption unit operating in accordance with said method of public-key cryptography.

21. The method of claim 15, wherein said step of hashing includes entering said user password into an MD5 algorithm.

22. The method of claim 18, further including the steps of:

requiring a user to enter a new user password; and generating a new access key.

23. A computer readable medium having a set of instructions stored therein, which when executed by a computer, causes the computer to secure an access key by performing the steps of:

encrypting said access key with a first encryption algorithm to form a first encrypted version of said access key;

encrypting said access key with a second asymmetric encryption algorithm to form a second encrypted version of said access key; and storing the first encrypted version and the second encrypted version of said access key.

24. The computer readable medium of claim 23, further comprising instructions for performing the step of:

decrypting said first encrypted version of said access key with a decryption algorithm.

25. The computer readable medium of claim 23, wherein the instructions for performing the step of encrypting said access key with a second asymmetric algorithm include instructions for obtaining a public key from a public-private key pair.

26. The computer readable medium of claim 23, further comprising instructions for performing the step of:

receiving a decrypted access key, said decrypted access key having been remotely decrypted with an asymmetric decryption algorithm with a private key.

* * * * *